United States Patent [19]

Ito et al.

[11] 4,315,127
[45] Feb. 9, 1982

[54] ELECTRO-SLAG WELDING METHOD

[75] Inventors: Yoshinori Ito, Nishinomiya; Masahiko Ikeda, Ashiya; Junji Furuichi, Nishinomiya, all of Japan

[73] Assignee: Sumitomo Metal Industries Limited, Osaka, Japan

[21] Appl. No.: 89,485

[22] Filed: Oct. 30, 1979

Related U.S. Application Data

[63] Continuation of Ser. No. 710,331, Jul. 30, 1976, abandoned, which is a continuation of Ser. No. 510,595, Sep. 30, 1974, abandoned.

[30] Foreign Application Priority Data

Oct. 6, 1973 [JP] Japan ............................... 48-112669
Oct. 6, 1973 [JP] Japan ............................... 48-112670

[51] Int. Cl.$^3$ ............................................ B23K 25/00
[52] U.S. Cl. ............................ 219/73.1; 219/137 R; 219/145.23; 219/145.32
[58] Field of Search ............. 219/73.1, 145.23, 145.32, 219/137 R

[56] References Cited

U.S. PATENT DOCUMENTS 2,164,104  6/1939  Bereit ........................... 219/145.23
3,558,845  1/1971  Norcross ........................... 219/73.1
3,825,716  7/1974  Kokura et al. ..................... 219/73.1
3,869,592  3/1975  Paton et al. ....................... 219/73.1

Primary Examiner—C. C. Shaw
Attorney, Agent, or Firm—Watson, Cole, Grindle & Watson

[57] ABSTRACT

An electro-slag welding method using as a consumable electrode a strip of mild steel and an electric insulating material. The steel strip has a width substantially equal to the thickness of the plate material to be welded. The electric insulating material is composed of a slag-forming agent, a deoxidizing agent and an alloying agent and is disposed between the steel strip and the material to be welded, and also between the strip and shoe, if necessary.

The electric insulating material used in the welding method is provided in the form of two plates disposed on opposite sides of the steel strip, or in a hollow rectangular form to enclose the steel strip.

The electric insulating material is molded from powdered slag-forming agent, deoxidizing agent and alloying agent with a net of a mild steel material, which is used as core.

1 Claim, 6 Drawing Figures

ELECTRO-SLAG WELDING METHOD

CROSS REFERENCE TO RELATED APPLICATIONS

This application is a continuation application of application Ser. No. 710,331, filed July 30, 1976, now abandoned which in turn is a continuation application of Ser. No. 510,595, filed Sept. 30, 1974, now abandoned.

BACKGROUND OF THE INVENTION

1. Field of the Invention

This invention relates to an electro-slag welding method, and more particularly, to an electro-slag welding method using as an electrode a steel strip in place of the usual steel wire, and also using an insulating material prepared by adding deoxidizing agent and alloying agent to a slag-forming agent, which materials permit welding of a narrow gap. The invention also relates to the electro-slag welding material used in the method.

2. The Prior Art

As a method of high efficiency welding of very thick steel plates vertically positioned, there is known an electro-slag welding method of consumable nozzle type using a steel wire. This method, however, has a drawback in that any reduction in the quantity of the welding material from the standpoint of bettering the efficiency would lead to insufficient penetration in the vicinity of the surface of the plates being welded.

FIG. 1 outlines this conventional electro-slag welding method, in which a steel tube having an outer covering of an electric insulating material consisting of a component similar to the weld slag is disposed in the center of the welding gap and a steel wire is continuously supplied through the steel tube for electro-slag welding. FIG. 1a is a plan view, and FIG. 1b is a longitudinal sectional view. As shown in the Figures, the materials 1 to be welded, for instance steel plates, are disposed in vertical positions or like, and copper shoes or shoes of like metal 3 serving as consumable material are disposed on opposite sides of the gap 2, thus forming a mold-like structure. Then, a steel tube 5 (commonly termed a consumable nozzle) covered with an electric insulating material 4 consisting of a component similar to the welding slag, is disposed in the center of the welding gap 2, and a steel wire 6 is continuously supplied through the steel tube while passing curent through the molten slag 7 to melt the continuously supplied steel wire 6 through the heat generated by the electrical resistance, the molten material being progressively solidified from lower portions to achieve the welding. In FIG. 1b numeral 8 designates the molten metal, and numeral 9 the solidified metal (welding metal).

In this method, the edge preparation is simple, the welding set-up is simplified, and the welding operation is easy. Also, the welding can be done with a single layer. Further, reducing the welding gap in this method is advantageous with respect to economy in the quantity of steel wire required to fill the gap, i.e., it can be reduced, and it is also advantageous from the standpoint of efficiency, since the welding speed can be increased.

However, if the gap is made too small, the temperature gradient at the time of welding becomes large, so that loss of thermal balance between the direction of the gap and the direction of the thickness of the plate is likely to result, thus giving rise to the drawback of insufficient penetration in the vicinity of the plate surface due to insufficient heat. This tendency becomes more prominent with increase in the thickness of the plate. As a method of overcoming this drawback, it may be thought to vibrate the consumable nozzle in the direction of the plate thickness. Such a method, however, requires a vibrating mechanism, and the convenience peculiar to the instant invention is lost.

SUMMARY OF THE INVENTION

The inventors of the present invention have invented an electro-slag welding method using a steel strip as a consumable electrode (hereinafter referred to as steel strip electro-slag welding method), and thus the present invention relates to improvements in the steel strip electro-slag welding method. In this method, welding the electro-slag welding is effected by continuously supplying a steel strip having a width substantially equal to the thickness of the plates being welded while providing an insulating material composed of slag-forming agent, deoxidizing agent and alloying agent between the steel strip and the material being welded and, if necessary, between the strip and shoes holding the material being welded. The present invention is characterized by the use of an improved insulator for facilitating the operation, and the insulator is molded with the use of a net of mild steel as its core.

In the aforesaid electro-slag welding method, use is made of an insulator, which is provided on the consumable nozzle for electrically insulating the steel strip from the material being welded and also sometimes from the shoes holding the material being welded, which insulator progressively melts to provide molten slag and to supply deoxidizing agent and alloying agent to the weldment. The insulator is composed of various powdered slag-forming agent such as MgO, $SiO_2$, CaO and $CaF_2$ and contains adequate proportions of deoxidizing agent such as Fe-Mn and Fe-Si and alloying agents such as Fe-Mo, and can be molded with liquid glass such as sodium silicate. The steel strip is inserted between such insulators.

The above insulator is required to have a length equal to or greater than the welding length and sometimes reaches about 1 meter. The molded insulator molded from the mentioned powdery substance with liquid glass has poor elasticity and is very likely to be broken during handling, so that its use in industry encounters various difficulties.

While the previously mentioned prior art method is one in which the welding is effected by melting a steel wire about 3 mm in diameter for filling the welding gap with the melt, an aspect of the present invention is to provide an electro-slag welding method using, in place of the steel wire, a strip of mild steel having a thickness of about 0.5 to 1.5 mm and a width substantially equal to the thickness of the plates being welded, the strip being wound up into the form of a roll and continuously supplied, as well as the electro-slag welding material used for this method.

Another aspect of the invention is to provide an electro-slag welding method which uses an insulator molded in the form of plates or a hollow rectangular tube with a net of mild steel as the core of the molding, the insulator being thus able to be handled without fear of breakage, to ensure a steady supply of the slag material, and hence ensuring sufficient electro-slag welding material for this method.

This invention will be now better understood by reference to the accompanying drawings and the following discussion.

DESCRIPTION OF THE PREFERRED EMBODIMENT

Figure 1A:
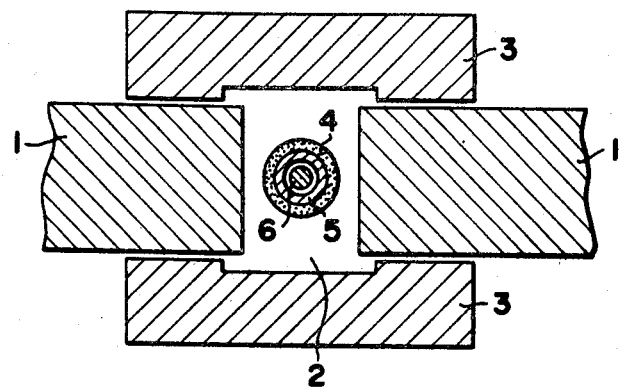
FIGS. 1a and 1b represent a schematic plan view and a longitudinal sectional view, respectively, outlining the prior art electro-slag welding method.
Figure 1B:
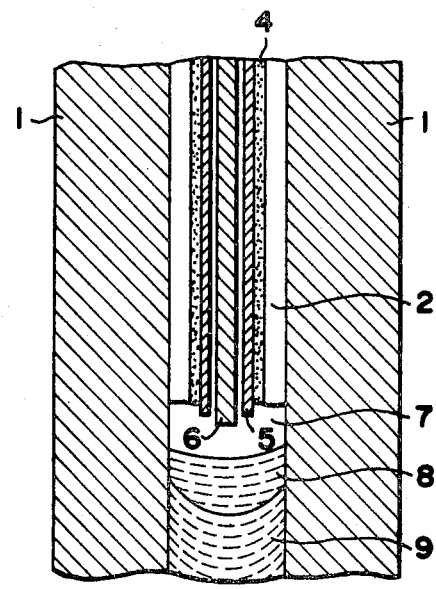
Figure 2:
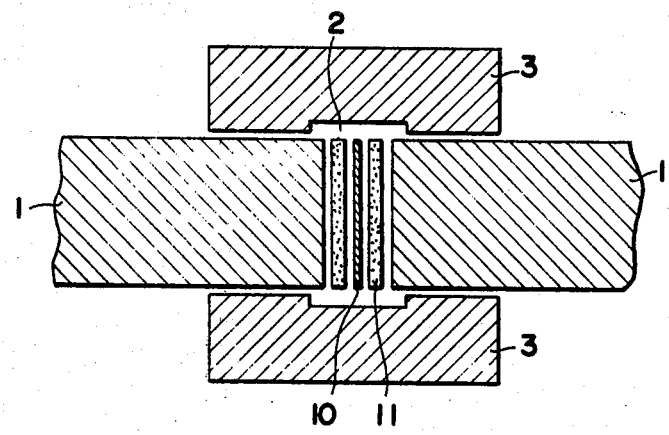
FIGS. 2 and 3 are plan views showing embodiments of the present invention.

Referring now to FIG. 2, two plates of an insulating material 11 are disposed over the entire length of the gap 2 to electrically insulate the steel strip 10 from the material 1 being welded as mentioned earlier. The steel strip 10 is inserted between the two insulator plates 11 and is continuously supplied for electro-slag welding similar to that shown in FIG. 1.

In this method, substantially uniform heating can be obtained since the width of the steel strip is made substantially equal to the plate thickness. Thus, it is possible to eliminate any lack of fusion of poor penetration in the vicinity of the surface portion. If the steel strip has two small a thickness, such as less than 0.5 mm, it is likely to buckle while it is being supplied, causing interruption of the welding. On the other hand, with a thickness exceeding 1.5 mm, particularly 2.0 mm, the winding of the steel strip into the form of a roll, correction of its bend and its smooth supply are difficult. For these reasons, a strip of very mild steel having a thickness ranging from about 0.5 mm to about 1.5 mm is used. With this range of electrode plate thickness (0.5 to 1.5 mm), the welding gap may be made as narrow as about 6 to 3 mm. Thus, it is possible to greatly reduce the quantity of heat required for the welding and obtain improved impact characteristic of the weldment. Angular deformation and contraction can also be reduced, so that this method is effective for reducing the welded bond brittleness. Since the portion subject to the thermal effect is reduced, materials having sharper heat sensitivity may also be employed.

The electric insulating material, which is similar to the slag component, is disposed in the welding gap between the steel strip serving as the consumable electrode and the material being welded and sometimes also between the steel strip and the shoes holding the material being welded. In accordance with another aspect of the invention, there is used in forming the insulating material a mixture prepared by adding a deoxidizing agent and an alloying agent to a slag-forming agent. For filling the welding gap, the insulator is preferably in the form of a plate-like molding as is shown. Also, with the addition of the deoxidizing agent and alloying agent it is possible to obtain high quality molten metal and freely obtain the desired strength and property of the weld.

In the already practiced electro-slag welding using a plate-like electrode with a thickness of 6 to 12 mm, the electrode cannot be wound into the form of a roll due to its large thickness, so that the welding gap is inevitably large, sometimes as large as 20 to 40 mm. Although this process is used for welding very thick plates with large heat, it is necessary to replenish the flux during the welding operation.

In contrast, the method according to the invention, which uses a very thin strip of mild steel in place of steel wire or plate electrode, permits electro-slag welding with a welding gap less than one half that required with the prior art method using the wire. Thus, various marked effects can be obtained. For example, it is possible to reduce the quantity of welding material required to one half, double or increase to even a greater extent the welding speed, reduce the fragility of the weldment and reduce the stress produced at the time of solidification and contraction of the molten metal.

Further, by using the electric insulating material in the form of a plate-like molding the consumable electrode constituted by a thin steel strip may be correctly led to the welding portion, and the welding operation may be carried out readily and smoothly.

In Tables 1, 2, 3, 6, 7 and 9 set forth below, stating the chemical composition of various steel parts employed in practicing the invention, the difference between the total percentage of chemical components specified, in each case, and 100% consists, of course, of iron (Fe).

A first example of the invention will now be given.

This example concerns electro-slag welding of 40 mm thick SM 50 B.

(i) The chemical composition and mechanical properties of the steel plate used (40 mm thick, SM 50 B) are as in Table 1.

TABLE 1

| Chemical composition (in % by weight) | | | | | Mechanical properties | |
|---|---|---|---|---|---|---|
| C | Si | Mn | P | S | Y.P. (kg/mm$^2$) | T.S. (kg/mm$^2$) |
| 0.15 | 0.38 | 1.39 | 0.015 | 0.016 | 34.5 | 52.2 |

(ii) The materials used for the welding are as in Table 2.

TABLE 2

| | Steel strip | | | | |
|---|---|---|---|---|---|
| Dimentions (mm) | | Chemical composition (% by weight) | | | |
| Thickness | Width | C | Si | Mn | P | S |
| 1 | 40 | 0.05 | tr | 0.27 | 0.015 | 0.008 |

| | Insulating material | |
|---|---|---|
| | | Composition (%) |
| Dimentions (mm) | | Deoxidizing agent |
| Thickness | Width | Slag forming agent | plus alloying agent |
| 3 | 40 | 96.3 | 3.7 |

The proportions of the slag-forming agent, deoxidizing agent and alloying agent may be suitably selected in accordance with the composition of the material to be welded.

(iii) The materials used for the prior-art welding method are as in Table 3.

TABLE 3

| Steel wire | Chemical composition (% by weight) | | | | |
|---|---|---|---|---|---|
| Diameter (mm) | C | Si | Mn | P | S |
| 3.2 | 0.09 | 0.03 | 1.58 | 0.014 | 0.009 |
| Consumable nozzle Steel tube Dimensions (mm) | | Chemical composition (% by weight) | | | |
| Outer diameter | Thickness | C | Si | Mn | P | S |
| 10 | 3 | 0.10 | tr | 0.40 | 0.015 | 0.012 |

TABLE 3-continued

| Insulator Thickness (mm) | Composition (%) | |
|---|---|---|
| | Slag-forming agent | Deoxidizing and alloying agents |
| 2 | 100 | 0 |

(iv) The welding conditions are as in Table 4.

TABLE 4

| | Welding current (amp.) | Welding voltage (volts) | Welding speed (cm/min.) | Welding gap (mm) |
|---|---|---|---|---|
| Method according to the invention | 500 | 32 | 5.5 | 10 |
| Prior-art method | 440 | 39 | 2.6 | 20 |

(v) The results of welding are as in Table 5.

TABLE 5

| | Welding speed (cm/min.) | Charpy impact value vEo (kg-m) | | Maximum contraction of weldment (mm) | Quantity of materials used for welding (kg-m) |
|---|---|---|---|---|---|
| | | Welding metal | Heat affected zone | | |
| Method according to the invention | 5.5 | 7.9 | 3.8 | 2.5 | 3.62 (steel strip) |
| Prior-art method | 2.6 | 5.2 | 2.9 | 4.2 | 6.73 (steel wire) |

Figure 3:
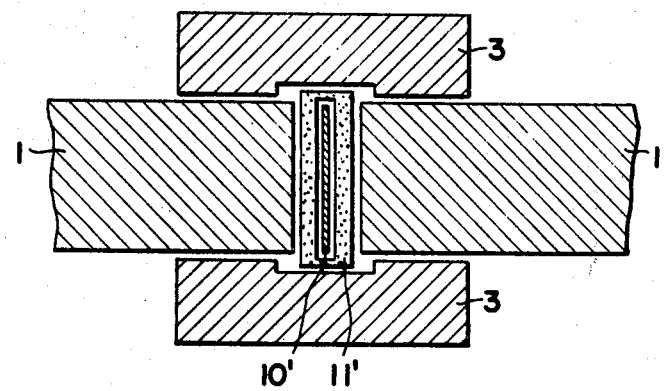

FIG. 3 shows another embodiment, in which insulation is provided between the steel strip and the material being welded and also the shoe holding the material being welded with a hollow alongate one-piece insulator, with the steel strip being inserted therethrough. In the Figure, 10' designates the steel strip and 11' the insulator molding.

Figure 4A:
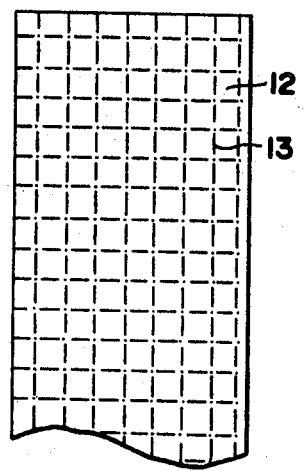
FIGS. 4a and 4b are a plan view and a longitudinal sectional view, respectively, showing an insulator molding used in accordance with the present invention.
Figure 4B:
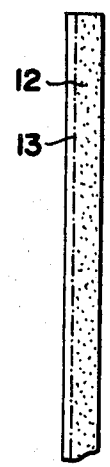

FIG. 4 shows the structure of the insulator molding used in accordance with the invention. In the Figure, 12 designates the insulator composed of slag-forming agent, deoxidizing agent and alloying agent, and 13 a net of mild steel.

A second example of the invention will now be given.

In this example, high tension steel plates with a thickness of 35 mm and tensile strength 50 kg/mm² were welded by using an electrode having a thickness of 1 mm and a chemical composition as shown in Table 6 and a hollow rectangular insulator produced from the materials shown in Table 7. Table 8 shows the welding conditions, and Table 9 shows the properties of the weld metal.

TABLE 6

| (Chemical composition of electrode) | | | | |
|---|---|---|---|---|
| C | Si | Mn | P | S |
| 0.05 | tr | 0.27 | 0.015 | 0.008 |

TABLE 7

| (Insulator) |
|---|
| Insulating material (Composition of the insulating material exclusive of the core) |

Slag-forming agent (inclusive   Deoxidizing agent and alloying

TABLE 7-continued

| (Insulator) | | | |
|---|---|---|---|
| of the solidifier) | | agent (included as alloyed steel) | |
| CaO | 19% | Si | 0.75% |
| SiO₂ | 39 | Mn | 1.75 |
| MgO | 6 | Mo | 0.25 |
| MnO | 18 | Fe | 2.75 |
| CaF₂ | 7 | | |
| Al₂O₃ | 2 | Grain size (of the material) being less than 20 mesh | |
| TiO₂ | 2 | | |
| Na₂O | 1.5 | | |

| Metal net | | | | | | |
|---|---|---|---|---|---|---|
| Shape | | | | | | |
| Diameter of element wire | Mesh | Composition of element line | | | | |
| | | C | Si | Mn | P | S |
| 0.5mm | 20 | 0.07 | tr | 0.19 | 0.015 | 0.012 |

TABLE 8

| (Welding conditions) | |
|---|---|
| Joint gap | 12mm |
| Welding current | 500 amp. |
| Welding voltage | 35 volts |
| Welding speed | 5.3cm/min. |

TABLE 9

| (Properties of the weld metal) | | |
|---|---|---|
| Chemical composition (%) | C | 0.09 |
| | Si | 0.40 |
| | Mn | 1.39 |
| | Mo | 0.19 |
| Impact test with 2-mm V notch | 0° C. | 7.2kg/m |
| | −20° C. | 4.3kg/m |
| Tensile strength | | 54.2kg/mm² |
| Elongation | | 27% |

The insulator produced in this way sufficiently meets its intended use and can be sufficiently employed on an industrial basis, thus making it possible to smoothly effect the electro-slag welding using the steel strip as an electrode.

We claim:

1. An electro-slag welding method which requires the use of reduced amounts of welding materials, said method comprising:
   (a) fixedly positioning the elements to be welded together by means of opposed metal clamping members so as to form between the elements to be welded a substantially vertically extending gap of no more than about 20 mm, said elements to be welded together having substantially equivalent thicknesses,
   (b) positioning in said gap a strip of mild steel as a consumable electrode, said strip of mild steel having a thickness of between 0.5 and 1.5 mm and a width substantially equal to thicknesses of the elements to be welded together, said strip of mild steel being encased in hollow, rectangular-shaped tube consisting of an electrically insulating material molded around a metal net core, said electrically insulating material comprising a mixture of a slag-forming agent, a deoxidizing agent and an alloying agent, and
   (c) passing electrical current through said strip of mild steel to melt portions of said steel strip and said electrically insulating material and accomplish said welding, while feeding said strip of mild steel through said hollow, rectangular-shaped tube.

* * * * *